(12) United States Patent
Baba

(10) Patent No.: US 11,662,566 B2
(45) Date of Patent: May 30, 2023

(54) OBJECTIVE LENS FOR ENDOSCOPE AND ENDOSCOPE

(71) Applicant: FUJIFILM Corporation, Tokyo (JP)

(72) Inventor: Tomoyuki Baba, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 117 days.

(21) Appl. No.: 17/328,243

(22) Filed: May 24, 2021

(65) Prior Publication Data
US 2021/0364779 A1 Nov. 25, 2021

(30) Foreign Application Priority Data

May 25, 2020 (JP) .............................. JP2020-090930
May 13, 2021 (JP) .............................. JP2021-081906

(51) Int. Cl.
*G02B 23/24* (2006.01)
*G02B 7/04* (2021.01)
*G02B 9/34* (2006.01)

(52) U.S. Cl.
CPC ............. *G02B 23/243* (2013.01); *G02B 7/04* (2013.01); *G02B 9/34* (2013.01)

(58) Field of Classification Search
CPC .......... G02B 23/243; G02B 7/04; G02B 9/34; G02B 7/08; G02B 15/144511
See application file for complete search history.

(56) References Cited

U.S. PATENT DOCUMENTS

2015/0022907 A1\* 1/2015 Yamamoto ......... G02B 23/2438
359/749

FOREIGN PATENT DOCUMENTS

JP 2876252 B2 3/1999

\* cited by examiner

*Primary Examiner* — James C. Jones
(74) *Attorney, Agent, or Firm* — Studebaker & Brackett PC

(57) ABSTRACT

An objective lens for an endoscope includes only four lens groups as lens groups, and the four lens groups consist of a negative first lens group, a positive second lens group, a negative third lens group, and a positive fourth lens group that are arranged in this order from an object side. The first lens group is fixed and the second and third lens groups are moved during focusing on an object positioned at the nearest point from an object positioned at the farthest point. The objective lens for an endoscope satisfies a predetermined conditional expression related to a focal length of an entire system and a focal length of the third lens group.

18 Claims, 11 Drawing Sheets

FIG. 1
EXAMPLE 1
FARTHEST POINT-OBSERVATION STATE
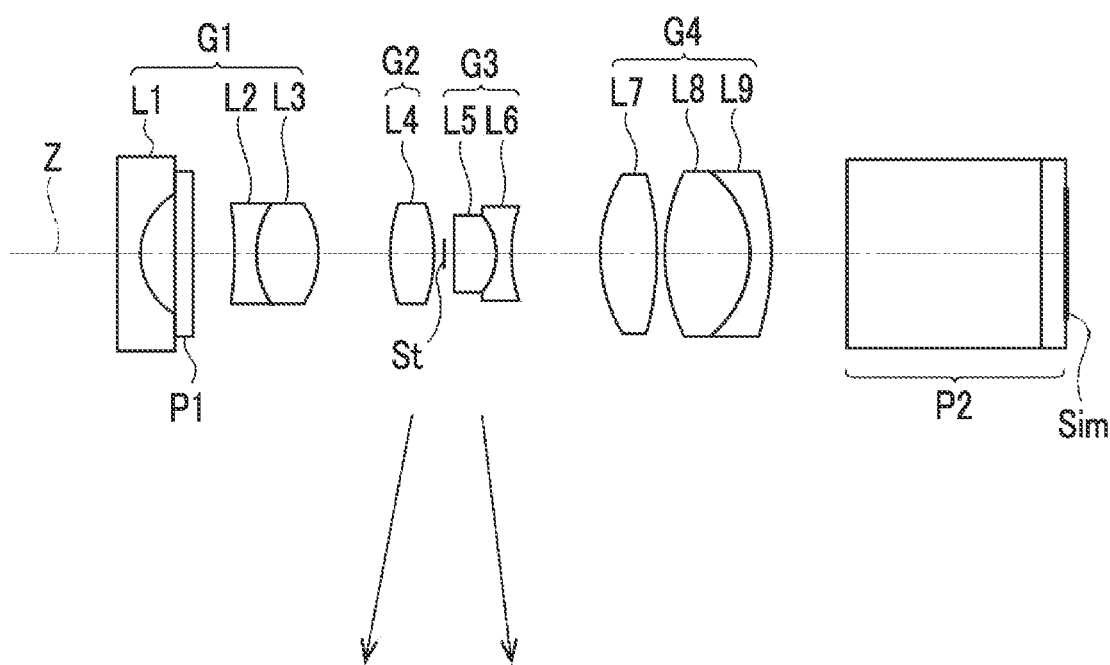
NEAREST POINT-OBSERVATION STATE
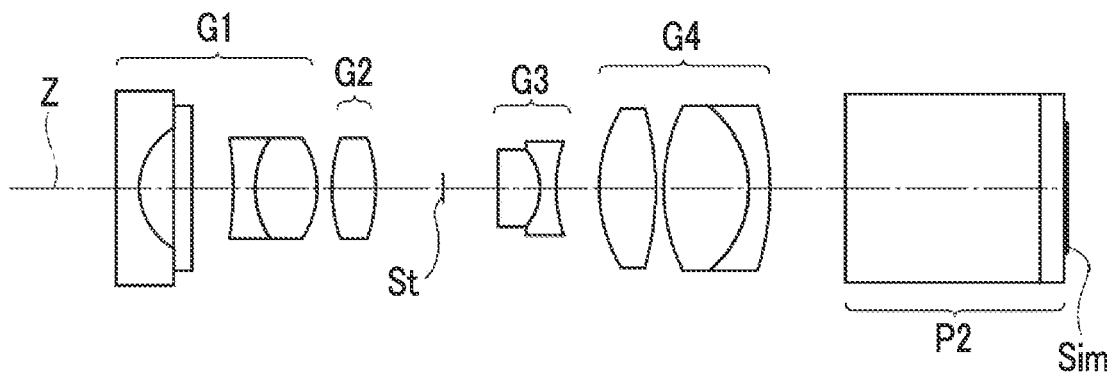

FIG. 3
EXAMPLE 2
FARTHEST POINT-OBSERVATION STATE
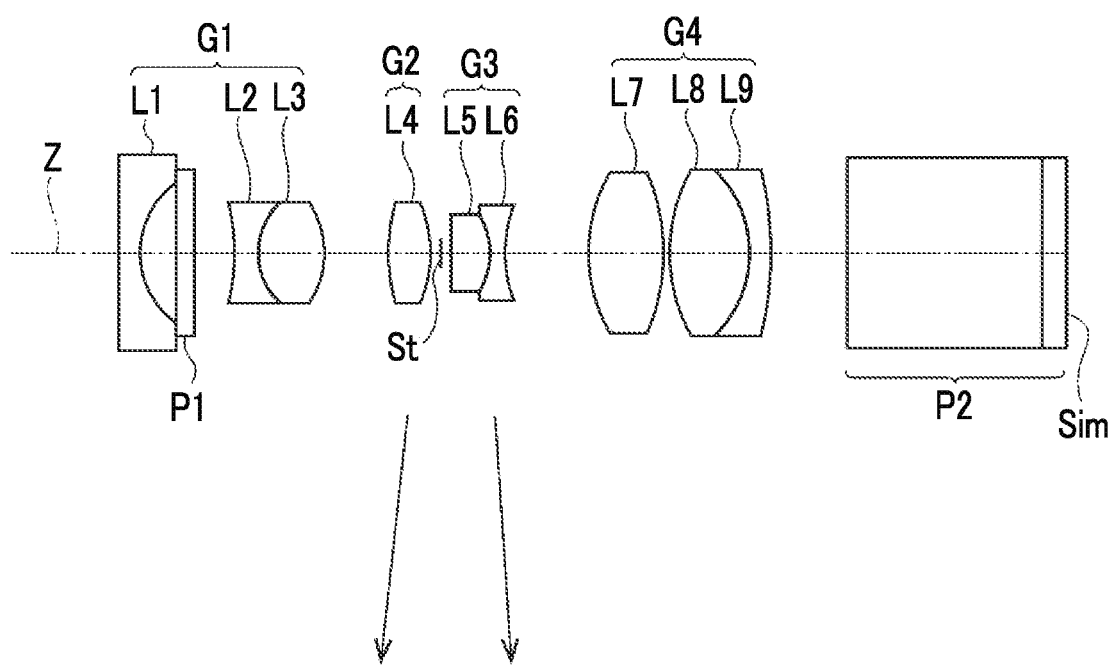
NEAREST POINT-OBSERVATION STATE
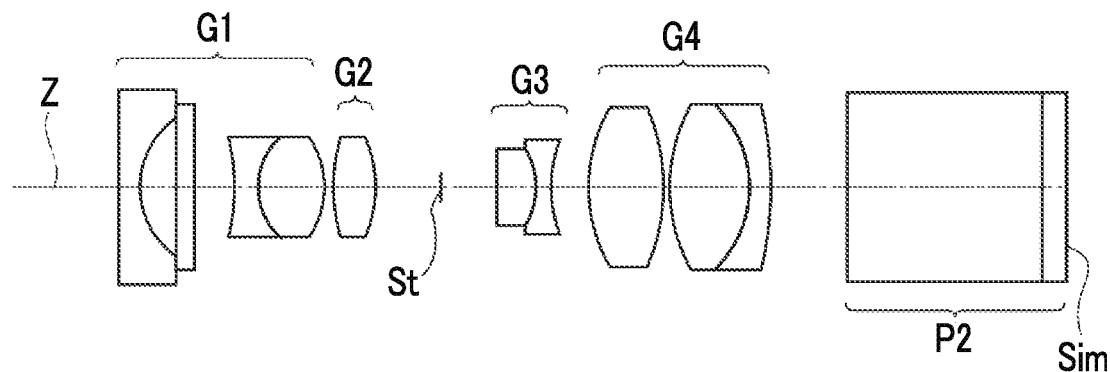

FIG. 5
EXAMPLE 3
FARTHEST POINT-OBSERVATION STATE
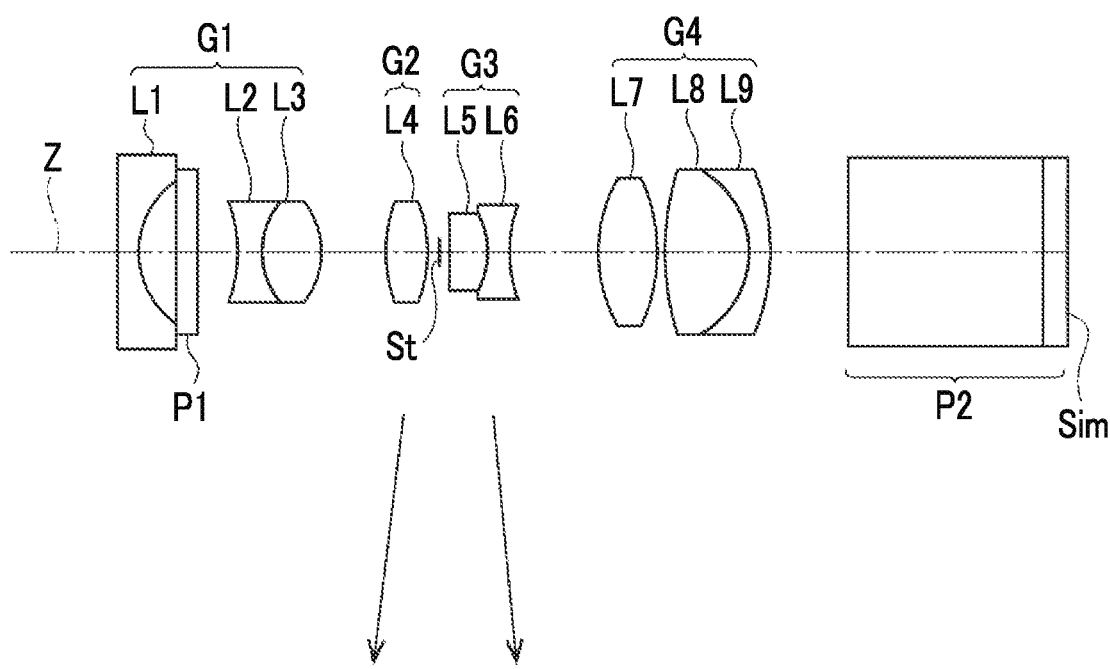
NEAREST POINT-OBSERVATION STATE
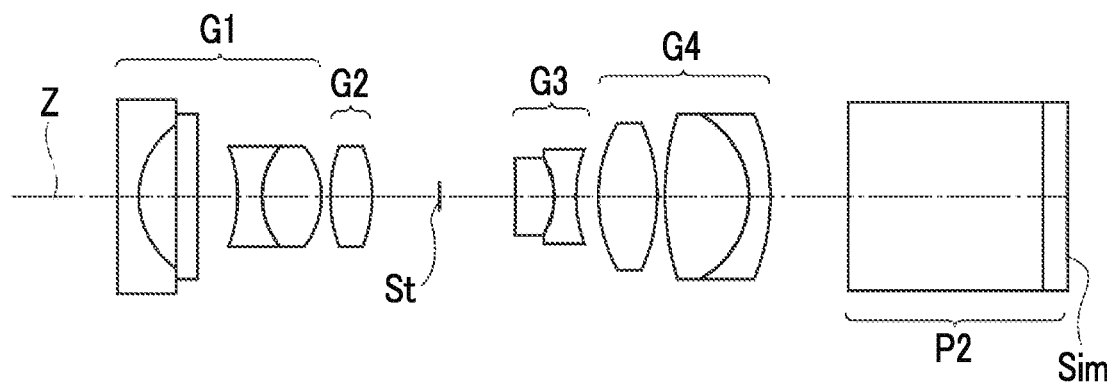

FIG. 7
EXAMPLE 4
FARTHEST POINT-OBSERVATION STATE
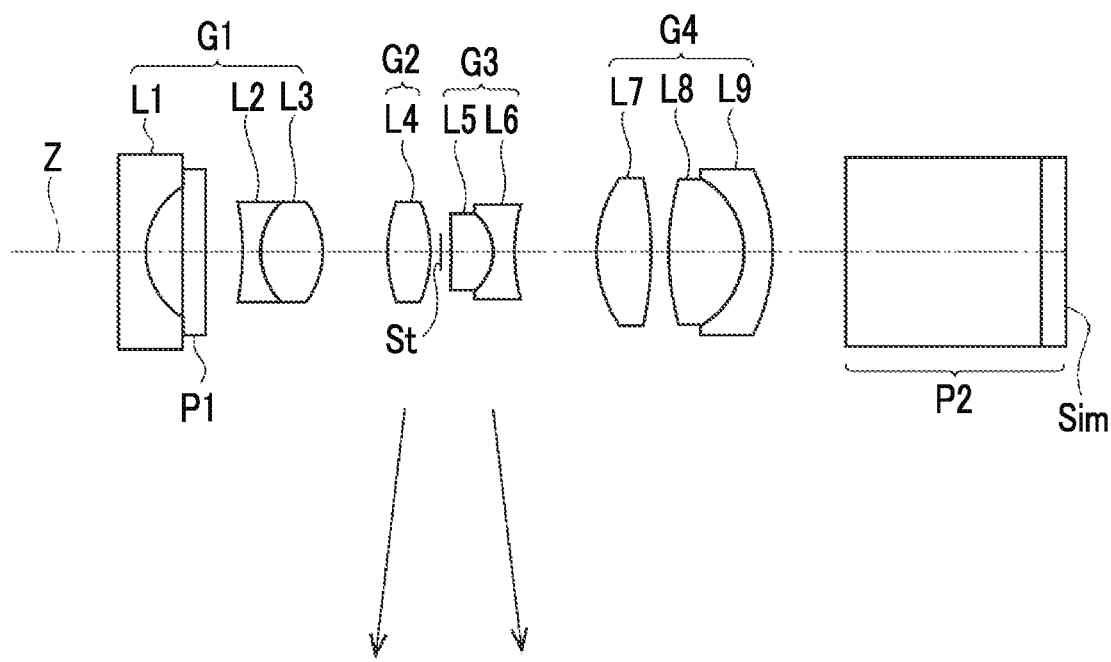
NEAREST POINT-OBSERVATION STATE
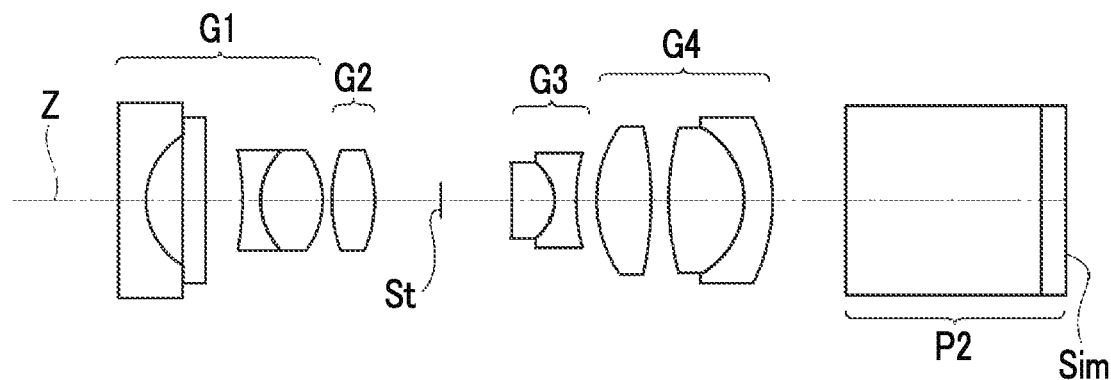

EXAMPLE 4

FIG.9
EXAMPLE 5
FARTHEST POINT-OBSERVATION STATE
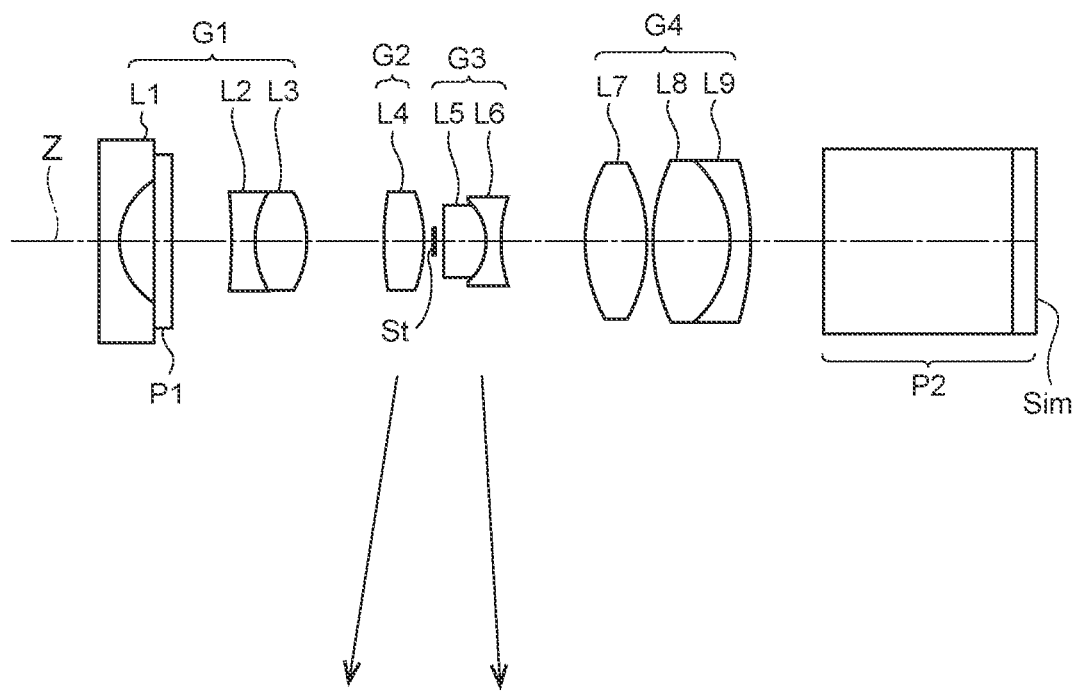
NEAREST POINT-OBSERVATION STATE
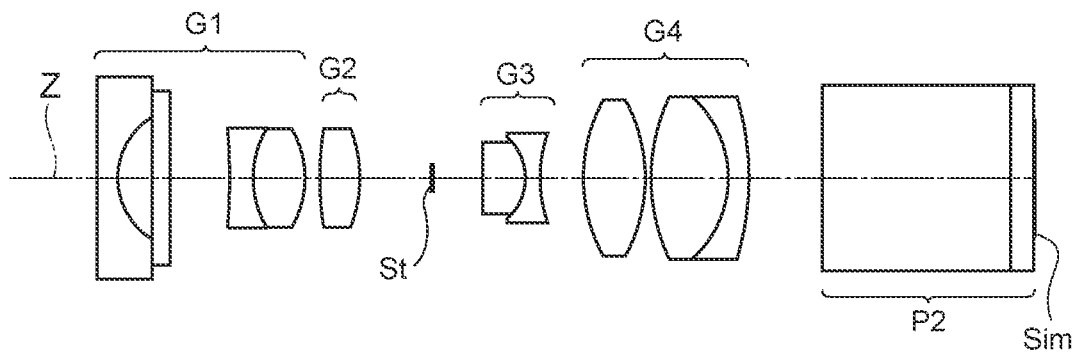

OBJECTIVE LENS FOR ENDOSCOPE AND ENDOSCOPE

CROSS-REFERENCE TO RELATED APPLICATIONS

The present application claims priority under 35 U.S.C. § 119 to Japanese Patent Application No. 2020-090930, filed on May 25, 2020 and Japanese Patent Application No. 2021-081906, filed on May 13, 2021. The above application is hereby expressly incorporated by reference, in its entirety, into the present application.

BACKGROUND OF THE INVENTION

1. Field of the Invention

The present disclosure relates to an objective lens for an endoscope and an endoscope.

2. Description of the Related Art

In the related art, an objective lens disclosed in JP2876252B is known as an objective lens used for an endoscope.

SUMMARY OF THE INVENTION

With an endoscope, there are a desire to observe a wide range as a whole and a desire to partially observe an affected area or the like found in the overall observation in detail. Accordingly, there is a demand for an objective lens for an endoscope that can be used while being switched between a far point-side observation state suitable for overall observation and a near point-side magnification observation state suitable for partial observation. Particularly, a wide angle of view is required in the far point-side observation state and high image formation magnification is required in the near point-side magnification observation state. Further, the objective lens for an endoscope is also required to suppress an increase in the size of an optical system and to be capable of acquiring a high-quality image while satisfying the above-mentioned desires.

The disclosure has been made in consideration of the above-mentioned circumstances, and an object of the disclosure is to provide an objective lens for an endoscope that maintains good optical performance during observation at an object distance over the entire range from the farthest point to the nearest point since both a wide angle of view in a far point-side observation state and high magnification in a near point-side observation state are achieved while an increase in the size of an optical system is suppressed, and an endoscope including the objective lens for an endoscope.

An objective lens for an endoscope according to an aspect of the disclosure comprises only four lens groups as lens groups, and the four lens groups consist of a first lens group having negative refractive power, a second lens group having positive refractive power, a third lens group having negative refractive power, and a fourth lens group having positive refractive power that are arranged in this order from an object side toward an image side. The first lens group is fixed and the second and third lens groups are moved along an optical axis during focusing on an object positioned at a nearest point from an object positioned at a farthest point. In a case where a focal length of an entire system, which focuses on the object positioned at the farthest point, is denoted by fw, a focal length of the entire system, which focuses on the object positioned at the nearest point, is denoted by ft, and a focal length of the third lens group is denoted by f3, Conditional expressions (1) and (2) are satisfied.

$$0 < fw/ft < 0.63 \tag{1}$$

$$-2.3 < f3/fw < 0 \tag{2}$$

It is preferable that the objective lens for an endoscope according to the aspect of the disclosure satisfies at least one of Conditional expression (1-1) or Conditional expression (2-1).

$$0.5 < fw/ft < 0.62 \tag{1-1}$$

$$-2.1 < f3/fw < -1.5 \tag{2-1}$$

In a case where a focal length of the second lens group is denoted by f2, it is preferable that the objective lens for an endoscope according to the aspect of the disclosure satisfies Conditional expression (3) and it is more preferable that the objective lens for an endoscope according to the aspect of the disclosure satisfies Conditional expression (3-1).

$$1.9 < f2/fw < 5 \tag{3}$$

$$2.2 < f2/fw < 2.8 \tag{3-1}$$

In a case where a combined focal length of the first and second lens groups in a state where the objective lens for an endoscope focuses on the object positioned at the nearest point is denoted by f12t and a combined focal length of the third and fourth lens groups in a state where the objective lens for an endoscope focuses on the object positioned at the nearest point is denoted by f34t, it is preferable that the objective lens for an endoscope according to the aspect of the disclosure satisfies Conditional expression (4) and it is more preferable that the objective lens for an endoscope according to the aspect of the disclosure satisfies Conditional expression (4-1).

$$0 < f12t/f34t < 0.25 \tag{4}$$

$$0 < f12t/f34t < 0.15 \tag{4-1}$$

It is preferable that an aperture stop is disposed between the second and third lens groups. In a case where the aperture stop is disposed between the second and third lens groups, it is preferable that the aperture stop is fixed during focusing on the object positioned at the nearest point from the object positioned at the farthest point.

It is preferable that the second lens group is moved to the object side and the third lens group is moved to the image side during focusing on the object positioned at the nearest point from the object positioned at the farthest point.

In a case where an interval on the optical axis between the second and third lens groups in a state where the objective lens for an endoscope focuses on the object positioned at the nearest point is denoted by d23t and an interval on the optical axis between the second and third lens groups in a state where the objective lens for an endoscope focuses on the object positioned at the farthest point is denoted by d23w, it is preferable that the objective lens for an endoscope according to the aspect of the disclosure satisfies Conditional expression (5) and it is more preferable that the objective lens for an endoscope according to the aspect of the disclosure satisfies Conditional expression (5-1).

$$1 < (d23t - d23w)/(fw \times ft)^{1/2} < 1.5 \tag{5}$$

$$1.1 < (d23t - d23w)/(fw \times ft)^{1/2} < 1.38 \tag{5-1}$$

The first lens group may be adapted to include only three lenses as lenses and the three lenses may consist of a first lens having negative refractive power, a second lens having negative refractive power, and a third lens having positive refractive power that are arranged in this order from the object side toward the image side; and the second and third lenses may be adapted to be cemented to each other. In a case where the first lens group is adapted to have the above-mentioned configuration, it is preferable that a lens surface of the first lens close to the object side is a flat surface.

The second lens group may be adapted to consist of a fourth lens having positive refractive power.

The third lens group may be adapted to consist of a cemented lens in which a fifth lens having positive refractive power and a sixth lens having negative refractive power are cemented in this order from the object side toward the image side.

The fourth lens group may be adapted to consist of a seventh lens having positive refractive power, an eighth lens having positive refractive power, and a ninth lens having negative refractive power that are arranged in this order from the object side toward the image side; and the eighth and ninth lenses may be adapted to be cemented to each other.

An endoscope according to another aspect of the disclosure comprises the objective lens for an endoscope according to the aspect of the disclosure.

"Consisting of" and "consist of" in this specification may intend to include: a lens substantially not having refractive power; optical elements other than a lens, such as a stop, a filter, and a cover glass; a lens flange; a lens barrel; an image pickup element; and the like other than described components.

"~ group having positive refractive power" in this specification means that a group has positive refractive power as a whole. Likewise, "~ group having negative refractive power" means that a group has negative refractive power as a whole. "Lens having positive refractive power" and "positive lens" are synonymous with each other. "Lens having negative refractive power" and "negative lens" are synonymous with each other. "~ lens group" is not limited to configuration where ~ lens group consists of a plurality of lenses and may have configuration where ~ lens group consists of only one lens.

"Single lens" means one lens that is not cemented. However, a compound aspherical lens (a lens of which a spherical lens and an aspherical film formed on the spherical lens are integrated and which functions as one aspherical lens as a whole) is treated as one lens without being regarded as a cemented lens. The sign of refractive power and the shape of the surface of a lens including an aspheric surface are considered in a paraxial region unless otherwise specified.

In this specification, "the entire system" means the objective lens for an endoscope. "Focal length" used in Conditional expressions is a paraxial focal length. Values in Conditional expressions are values that are obtained in a case where the d line is used as a reference. "d line", "C line", "F line", and "h line" described in this specification are emission lines, and the wavelength of the d line is 587.56 nm (nanometer), the wavelength of the C line is 656.27 nm (nanometer), the wavelength of the F line is 486.13 nm (nanometer), and the wavelength of the h line is 404.66 nm (nanometer).

According to the disclosure, it is possible to provide an objective lens for an endoscope that maintains good optical performance during observation at an object distance over the entire range from the farthest point to the nearest point since both a wide angle of view in a far point-side observation state and high magnification in a near point-side observation state are achieved while an increase in the size of an optical system is suppressed, and an endoscope including the objective lens for an endoscope.

BRIEF DESCRIPTION OF THE DRAWINGS

FIG. 1 is a cross-sectional view showing the configuration of an objective lens for an endoscope according to an embodiment of the disclosure corresponding to an objective lens for an endoscope of Example 1 of the disclosure.

FIG. 3 is a cross-sectional view showing the configuration of an objective lens for an endoscope of Example 2 of the disclosure.

FIG. 5 is a cross-sectional view showing the configuration of an objective lens for an endoscope of Example 3 of the disclosure.

FIG. 7 is a cross-sectional view showing the configuration of an objective lens for an endoscope of Example 4 of the disclosure.

FIG. 9 is a cross-sectional view showing the configuration of an objective lens for an endoscope of Example 5 of the disclosure.

DESCRIPTION OF THE PREFERRED EMBODIMENTS

Figure 2:
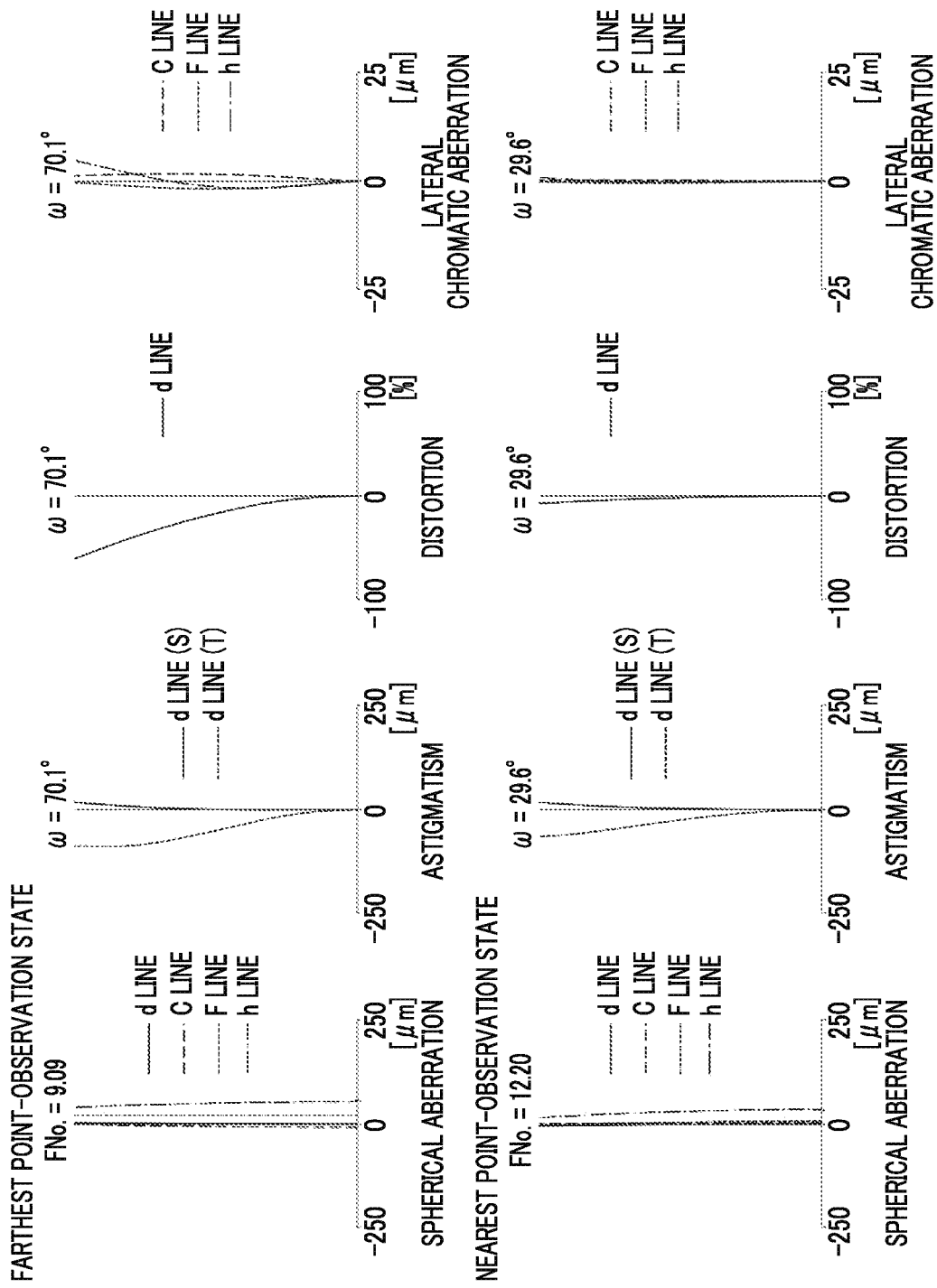
FIG. 2 is a diagram showing the respective aberrations of the objective lens for an endoscope of Example 1 of the disclosure.

Embodiments of the disclosure will be described in detail below with reference to the drawings. FIG. 1 is a diagram showing the configuration of an objective lens for an endoscope according to an embodiment of the disclosure in a cross section including an optical axis Z. An example shown in FIG. 1 corresponds to Example 1 to be described later. In FIG. 1, a left side is an object side and a right side is an image side. In this specification, a state where the objective lens is focused on an object positioned at the farthest point is referred to as a farthest point-observation state and a state where the objective lens is focused on an object positioned at the nearest point is referred to as a nearest point-observation state. In FIG. 1, the farthest point-observation state is shown in the upper row and the nearest point-observation state is shown in the lower row.

The objective lens for an endoscope according to the embodiment of the disclosure comprises only four lens groups as lens groups. The four lens groups consist of a first lens group G1 having negative refractive power, a second lens group G2 having positive refractive power, a third lens group G3 having negative refractive power, and a fourth lens group G4 having positive refractive power that are arranged along the optical axis Z in this order from the object side toward the image side. According to this configuration, it is easy to ensure good optical performance during observation at an object distance over the entire range from the farthest point to the nearest point while suppressing an increase in the size of an optical system.

The objective lens for an endoscope of an example shown in FIG. 1 is adapted so that the first lens group G1 is fixed and the second and third lens groups G2 and G3 are moved along the optical axis Z during focusing on an object positioned at the nearest point from an object positioned at the farthest point. Due to this configuration, it is easy to achieve both a wide angle of view in a far point-side observation state and high magnification in a near point-side observation state while maintaining good operability during observation. In this specification, "high magnification" means that the absolute value of image formation magnification is high.

Since the number of lens groups to be moved during focusing is set to two, it is possible to improve the degree of freedom of the setting of a focusing speed with respect to the movement distance of each lens group while simplifying a mechanism for moving the lens groups and suppressing a change in an aberration caused by the movement of the lens groups. Accordingly, the usability for a user can be improved. Further, since the lens group having positive refractive power and the lens group having negative refractive power are moved during focusing, it is possible to satisfactorily suppress a change in the aberration caused by the movement of the lens groups, particularly, a change in a chromatic aberration.

Furthermore, since the first lens group G1, which is a lens group closest to the object side, is not moved during focusing, it is advantageous for ensuring airtightness. In an endoscope, the objective lens for an endoscope is often mounted on the endoscope without a protective member, and a lens of the objective lenses for an endoscope closest to the object side is often made to have the function of an optical window. Since airtightness is required to be maintained in that case, configuration where the first lens group G1 is not moved is advantageous.

For example, in the example shown in FIG. 1, the second lens group G2 is moved to the object side and the third lens group G3 is moved to the image side during focusing on an object positioned at the nearest point from an object positioned at the farthest point. That is, an interval between the second and third lens groups G2 and G3 is changed during focusing on an object positioned at the nearest point from an object positioned at the farthest point. According to this configuration, it is easy to achieve both a wide angle of view in a far point-side observation state and high magnification in a near point-side observation state while maintaining good optical performance. Arrows, which indicate the schematic directions of movement of the second and third lens groups G2 and G3 during focusing on an object positioned at the nearest point from an object positioned at the farthest point, are shown between the upper and low rows in FIG. 1.

In a case where the focal length of the entire system, which focuses on an object positioned at the farthest point, is denoted by fw and the focal length of the entire system, which focuses on an object positioned at the nearest point, is denoted by ft, this objective lens for an endoscope is adapted to satisfy Conditional expression (1). Since "fw>0" is satisfied and "ft>0" is satisfied, "0<fw/ft" is satisfied with regard to the lower limit of Conditional expression (1). Since fw/ft is made to be smaller than the upper limit of Conditional expression (1), it is easy to achieve both a wide angle of view in a far point-side observation state and high magnification in a near point-side observation state. In order to obtain better characteristics, it is preferable that the objective lens for an endoscope satisfies Conditional expression (1-1). Since fw/ft is made to be larger than the lower limit of Conditional expression (1-1), it is easy to suppress an increase in the size of the optical system.

$$0 < fw/ft < 0.63 \tag{1}$$

$$0.5 < fw/ft < 0.62 \tag{1-1}$$

Further, in a case where the focal length of the entire system, which focuses on an object positioned at the farthest point, is denoted by fw and the focal length of the third lens group G3 is denoted by f3, this objective lens for an endoscope is adapted to satisfy Conditional expression (2). Since f3/fw is made to be larger than the lower limit of Conditional expression (2), it is easy to suppress an increase in the size of the optical system. Since "fw>0" is satisfied and the third lens group G3 has negative refractive power, that is, "f3<0" is satisfied, "f3/fw<0" is satisfied with regard to the upper limit of Conditional expression (2). In order to obtain better characteristics, it is preferable that the objective lens for an endoscope satisfies Conditional expression (2-1). Since where f3/fw is made to be smaller than the upper limit of Conditional expression (2-1), it is easy to ensure good optical performance during observation at an object distance over the entire range from the farthest point to the nearest point.

$$-2.3 < f3/fw < 0 \tag{2}$$

$$-2.1 < f3/fw < -1.5 \tag{2-1}$$

Furthermore, in a case where the focal length of the second lens group G2 is denoted by f2 and the focal length of the entire system, which focuses on an object positioned at the farthest point, is denoted by fw, it is preferable that this objective lens for an endoscope satisfies Conditional expression (3). Since f2/fw is made to be larger than the lower limit of Conditional expression (3), it is easy to ensure good optical performance during observation at an object distance over the entire range from the farthest point to the nearest point. Since f2/fw is made to be smaller than the upper limit of Conditional expression (3), it is easy to suppress an increase in the size of the optical system. In order to obtain better characteristics, it is preferable that the objective lens for an endoscope satisfies Conditional expression (3-1).

$$1.9 < f2/fw < 5 \tag{3}$$

$$2.2 < f2/fw < 2.8 \tag{3-1}$$

Moreover, in a case where the combined focal length of the first and second lens groups G1 and G2 in a state where the objective lens for an endoscope focuses on an object positioned at the nearest point is denoted by f12t and the combined focal length of the third and fourth lens groups G3 and G4 in a state where the objective lens for an endoscope focuses on an object positioned at the nearest point is denoted by f34t, it is preferable that the objective lens for an endoscope satisfies Conditional expression (4). Since the objective lens for an endoscope satisfies Conditional expression (4) so that a ratio of the combined refractive power of the first and second lens groups G1 and G2 to the combined refractive power of the third and fourth lens groups G3 and G4 is in the range of Conditional expression (4), it is easy to achieve both high magnification and the ensuring of good optical performance in a near point-side observation state. In order to obtain better characteristics, it is preferable that the objective lens for an endoscope satisfies Conditional expression (4-1).

$$0 < f12t/f34t < 0.25 \quad (4)$$

$$0 < f12t/f34t < 0.15 \quad (4\text{-}1)$$

Further, in a case where an interval on the optical axis between the second and third lens groups G2 and G3 in a state where the objective lens for an endoscope focuses on an object positioned at the nearest point is denoted by d23t and an interval on the optical axis between the second and third lens groups G2 and G3 in a state where the objective lens for an endoscope focuses on an object positioned at the farthest point is denoted by d23w, it is preferable that this objective lens for an endoscope satisfies Conditional expression (5). Since $(d23t-d23w)/(fw\times ft)^{1/2}$ is made to be larger than the lower limit of Conditional expression (5), it is easy to achieve both a wide angle of view in a far point-side observation state and high magnification in a near point-side observation state. Since $(d23t-d23w)/(fw\times ft)^{1/2}$ is made to be smaller than the upper limit of Conditional expression (5), it is easy to suppress an increase in the size of the optical system. In order to obtain better characteristics, it is preferable that the objective lens for an endoscope satisfies Conditional expression (5-1).

$$1 < (d23t-d23w)/(fw\times ft)^{1/2} < 1.5 \quad (5)$$

$$1.1 < (d23t-d23w)/(fw\times ft)^{1/2} < 1.38 \quad (5\text{-}1)$$

As exemplified in FIG. 1, the objective lens for an endoscope according to the embodiment of the disclosure can be adapted as follows. The first lens group G1 may include only three lenses as lenses. The three lenses may consist of a first lens L1 having negative refractive power, a second lens L2 having negative refractive power, and a third lens L3 having positive refractive power that are arranged in this order from the object side toward the image side; and the second and third lenses L2 and L3 may be adapted to be cemented to each other. In this case, it is easy to achieve both a wide angle of view in a far point-side observation state and the ensuring of good optical performance during observation at an object distance over the entire range from the farthest point to the nearest point without an increase in the size of the optical system.

It is preferable that the lens surface of the first lens L1 close to the object side is a flat surface. In this case, it is advantageous in reducing the outer diameter of the first lens L1. Further, the manufacturability of the first lens L1 can be improved and the adhesion of liquid and the like to the surface of the first lens L1 close to the object side can be reduced.

The second lens group G2 may be adapted to consist of a fourth lens L4 having positive refractive power. In this case, it is easy to ensure good optical performance during observation at an object distance over the entire range from the farthest point to the nearest point and particularly to ensure good optical performance about a spherical aberration and field curvature while forming the objective lens with the minimum number of lenses.

The third lens group G3 may be adapted to consist of a cemented lens in which a fifth lens L5 having positive refractive power and a sixth lens L6 having negative refractive power are cemented in this order from the object side toward the image side. In this case, it is easy to ensure good optical performance during observation at an object distance over the entire range from the farthest point to the nearest point and particularly to ensure good optical performance about an axial chromatic aberration and a lateral chromatic aberration while forming the objective lens with the minimum number of lenses.

The fourth lens group G4 may consist of a seventh lens L7 having positive refractive power, an eighth lens L8 having positive refractive power, and a ninth lens L9 having negative refractive power that are arranged in this order from the object side toward the image side; and the eighth and ninth lenses L8 and L9 may be adapted to be cemented to each other. In this case, it is easy to ensure good optical performance during observation at an object distance over the entire range from the farthest point to the nearest point and particularly to ensure good optical performance about field curvature and a lateral chromatic aberration while forming the objective lens with the minimum number of lenses.

An aperture stop St may be adapted to be disposed between the second and third lens groups G2 and G3. In this case, it is easy to suitably set an F number during observation at an object distance over the entire range from the farthest point to the nearest point. Accordingly, it is easy to ensure both the depth of field and good optical performance.

In a case where the aperture stop St is disposed between the second and third lens groups G2 and G3, it is preferable that the aperture stop St is fixed during focusing on an object positioned at the nearest point from an object positioned at the farthest point. In this case, it is possible to reduce the complexity of a mechanism while ensuring an effect obtained from the above-mentioned aperture stop St that is disposed between the second and third lens groups G2 and G3.

In the example shown in FIG. 1, a parallel plate-like optical member P1 is disposed between the first and second lenses L1 and L2 and an optical member P2 of which the incident surface and the emission surface are parallel to each other is disposed between the fourth lens group G4 and an image plane Sim. The optical member P1 is a member assuming a filter or the like, and the optical member P2 is a member assuming a prism, a filter, a cover glass, or the like. The optical members P1 and P2 are members not having refractive power. At least one of the optical member P1 or the optical member P2 can also be omitted.

Since the above-mentioned preferable configuration and possible configuration including even configuration related to Conditional expressions can be randomly combined, it is preferable that the above-mentioned preferable configuration and possible configuration are appropriately selectively employed according to specifications to be required.

Next, examples of the objective lens for an endoscope according to the embodiment of the disclosure will be described.

Example 1

Since a cross-sectional view showing the configuration of an objective lens for an endoscope of Example 1 is shown in FIG. 1 and an illustrating method therefor is as described above, the repeated description thereof will be partially omitted here. The objective lens for an endoscope of Example 1 consists of a first lens group G1 having negative refractive power, a second lens group G2 having positive refractive power, an aperture stop St, a third lens group G3 having negative refractive power, and a fourth lens group G4 having positive refractive power that are arranged in this order from the object side toward the image side. The second lens group G2 is moved to the object side and the third lens group G3 is moved to the image side during focusing on an object positioned at the nearest point from an object positioned at the farthest point. The first lens group G1 consists of a first lens L1, an optical member P1, a second lens L2, and a third lens L3 that are arranged in this order from the object side toward the image side. The second lens group G2 consists of a fourth lens L4. The third lens group G3 consists of a fifth lens L5 and a sixth lens L6 that are arranged in this order from the object side toward the image side. The fourth lens group G4 consists of a seventh lens L7, an eighth lens L8, and a ninth lens L9 that are arranged in this order from the object side toward the image side. The second and third lenses L2 and L3 are cemented to each other. The fifth and sixth lenses L5 and L6 are cemented to each other. The eighth and ninth lenses L8 and L9 are cemented to each other. Each of the first, fourth, and seventh lenses L1, L4, and L7 is a single lens. The above description is the overview of the objective lens for an endoscope of Example 1.

The basic lens data of the objective lens for an endoscope of Example 1 are shown in Table 1, and the specifications and variable surface intervals thereof are shown in Table 2. In Table 1, surface numbers, which are obtained in a case where the surface closest to the object side is set as a first surface and the surface number is increased toward the image side one by one, are written in the column of Sn, the radii of curvature of the respective surfaces are written in the column of R, and a surface interval on an optical axis between each surface and a surface, which is positioned on the image side of each surface so as to be adjacent to each surface, is written in the column of D. The refractive indexes of the respective components with respect to the d line are written in the column of Nd, and the Abbe's numbers of the respective components with respect to the d line are written in the column of vd.

In Table 1, the sign of the radius of curvature of a surface having a convex shape toward the object side is positive and the sign of the radius of curvature of a surface having a convex shape toward the image side is negative. In Table 1, the aperture stop St, the optical member P1, the optical member P2, and an image plane Sim are also shown together. In Table 1, a surface number and the expression of (St) are written in the column of the surface number of a surface corresponding to the aperture stop St and a surface number and the expression of (Sim) are written in the column of the surface number of a surface corresponding to the image plane Sim. In Table 1, the symbol of DD[ ] is used for a variable surface interval to which an interval is changed during focusing and the surface number of this interval close to the object side is added into [ ] and is written in the column of D.

Object distances, image formation magnification, focal lengths f, F numbers FNo., the maximum total angles 2ω of view, and the respective values of variable surface intervals in the farthest point-observation state and the nearest point-observation state are shown in Table 2. The object distance is a distance on the optical axis between an object and the lens surface of the first lens group G1 closest to the object side. (°) in the column of 2ω means that a unit is a degree. Values shown in Table 2 are values that are obtained in a case where the d line is used as a reference.

In the data of each table, a degree is used as the unit of an angle and mm (millimeter) is used as the unit of a length. However, since an optical system can be used even though an image is proportionally increased or reduced in size, other appropriate units can also be used. Further, numerical values, which are rounded off to a predetermined place, are written in each table to be described below.

TABLE 1

| | Example 1 | | | |
|---|---|---|---|---|
| Sn | R | D | Nd | vd |
| 1 | ∞ | 0.3800 | 1.88299 | 40.78 |
| 2 | 1.2133 | 0.5700 | | |
| 3 | ∞ | 0.3000 | 2.00100 | 29.13 |
| 4 | ∞ | 0.6800 | | |
| 5 | −5.6718 | 0.3600 | 1.91082 | 35.25 |
| 6 | 1.5928 | 1.0200 | 1.48749 | 70.24 |
| 7 | −1.5928 | DD[7] | | |
| 8 | 2.6867 | 0.7200 | 1.49700 | 81.54 |
| 9 | −2.6867 | DD[9] | | |
| 10(St) | ∞ | DD[10] | | |
| 11 | ∞ | 0.6900 | 1.89286 | 20.36 |
| 12 | −1.0260 | 0.2500 | 1.95375 | 32.32 |
| 13 | 2.5839 | DD[13] | | |
| 14 | 2.7027 | 0.9300 | 1.49700 | 81.54 |
| 15 | −5.1490 | 0.1300 | | |
| 16 | 3.2319 | 1.4000 | 1.43875 | 94.66 |
| 17 | −1.8159 | 0.3500 | 1.94595 | 17.98 |
| 18 | −4.8192 | 1.2757 | | |
| 19 | ∞ | 3.2000 | 1.88299 | 40.78 |
| 20 | ∞ | 0.4000 | 1.47144 | 65.41 |
| 21(Sim) | ∞ | | | |

TABLE 2

| | Example 1 | |
|---|---|---|
| | Farthest point-observation state | Nearest point-observation state |
| Object distance | 13.50 | 1.78 |
| Image formation magnification | −0.0785 | −0.7287 |
| f | 1.143 | 1.870 |
| FNo. | 9.09 | 12.20 |
| 2ω (°) | 140.2 | 59.2 |
| DD[7] | 1.18 | 0.24 |
| DD[9] | 0.17 | 1.10 |
| DD[10] | 0.17 | 0.91 |
| DD[13] | 1.45 | 0.71 |

A diagram showing the respective aberrations of the objective lens for an endoscope of Example 1 is shown in FIG. 2. A diagram showing a spherical aberration, a diagram showing astigmatism, a diagram showing distortion, and a diagram showing a lateral chromatic aberration are shown in FIG. 2 in this order from the left. In FIG. 2, the diagrams showing the respective aberrations obtained in the farthest point-observation state are shown in the upper row and the diagrams showing the respective aberrations obtained in the nearest point-observation state are shown in the lower row. The diagrams showing the respective aberrations obtained in the farthest point-observation state and the nearest point-observation state are diagrams in cases where an object distance is set to values shown in Table showing specifications. In the diagram showing the spherical aberration, aberrations with respect to the d line, the C line, the F line, and the h line are shown by a solid line, a long-dashed line, a short-dashed line, and an one-dot chain line, respectively. In the diagram showing astigmatism, an aberration with respect to the d line in a sagittal direction is shown by a solid line and an aberration with respect to the d line in a tangential direction is shown by a short-dashed line. In the diagram showing distortion, an aberration with respect to the d line is shown by a solid line. In the diagram showing a lateral chromatic aberration, aberrations with respect to the C line, the F line, and the h line are shown by a long-dashed line, a short-dashed line, and an one-dot chain line, respectively. FNo. in the diagram showing a spherical aberration means an F number, and ω in the diagrams showing the other aberrations means a half angle of view. Corresponding values of FNo. and w are shown at the upper ends of vertical axes of the respective diagrams in FIG. 2.

Since the symbols, meanings, writing methods, and illustrating methods for data about Example 1 are the same as those of other examples to be described below unless otherwise specified, the repeated description thereof will be omitted below.

Example 2

Figure 4:
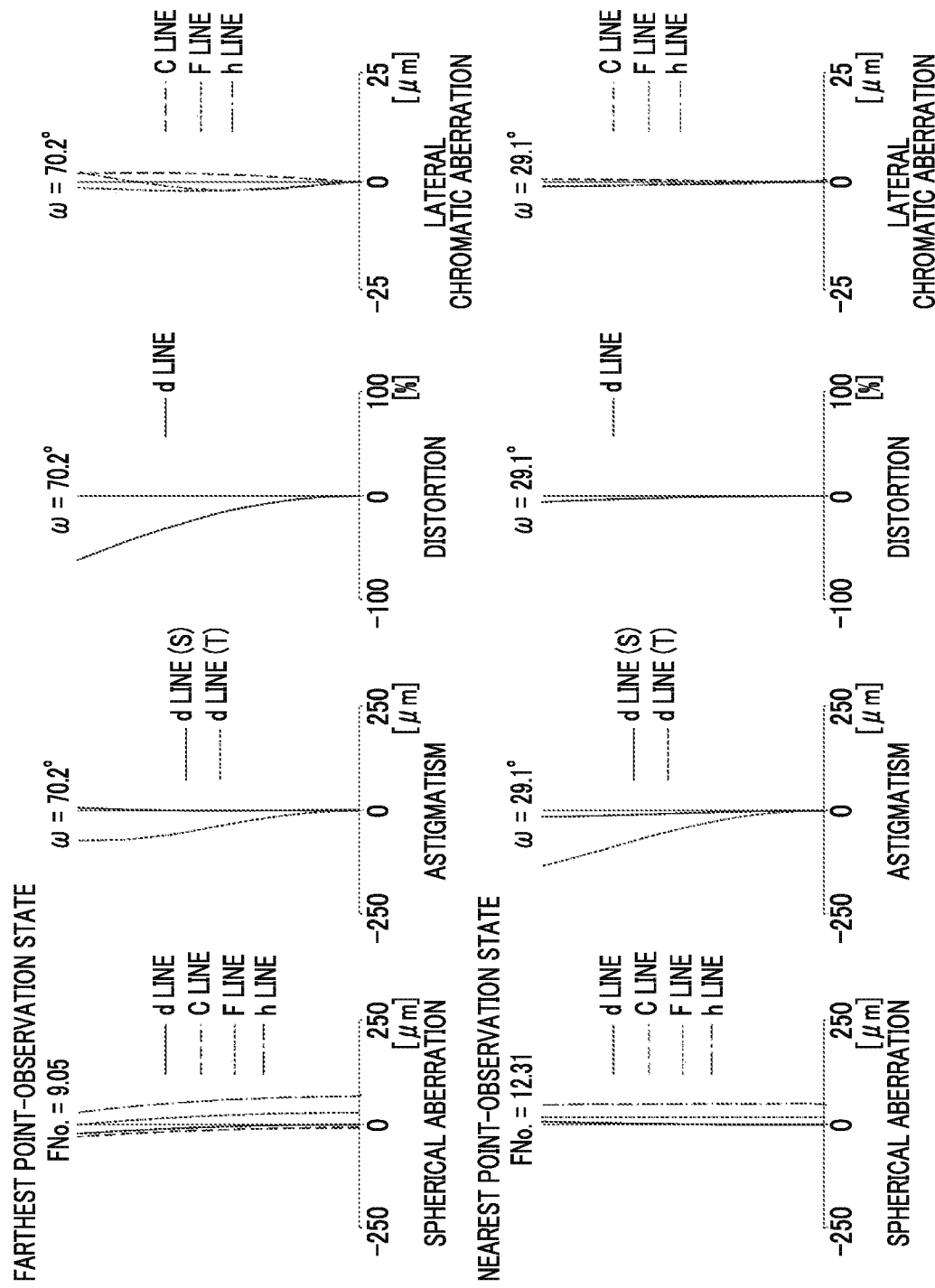
FIG. 4 is a diagram showing the respective aberrations of the objective lens for an endoscope of Example 2 of the disclosure.

A cross-sectional view showing the configuration of an objective lens for an endoscope of Example 2 is shown in FIG. 3. The objective lens for an endoscope of Example 2 has the same configuration as the overview of the objective lens for an endoscope of Example 1. The basic lens data of the objective lens for an endoscope of Example 2 are shown in Table 3, the specifications and variable surface intervals thereof are shown in Table 4, and diagrams showing the respective aberrations thereof are shown in FIG. 4.

TABLE 3

Example 2

| Sn | R | D | Nd | vd |
|---|---|---|---|---|
| 1 | ∞ | 0.3500 | 1.88299 | 40.78 |
| 2 | 1.4691 | 0.5900 | | |
| 3 | ∞ | 0.3000 | 2.00100 | 29.13 |
| 4 | ∞ | 0.6600 | | |
| 5 | −3.6492 | 0.3900 | 1.88299 | 40.78 |
| 6 | 1.2133 | 1.0700 | 1.49700 | 81.54 |
| 7 | −1.5391 | DD[7] | | |
| 8 | 3.1244 | 0.6900 | 1.49700 | 81.54 |
| 9 | −2.1743 | DD[9] | | |
| 10(St) | ∞ | DD[10] | | |
| 11 | ∞ | 0.6400 | 1.92286 | 18.90 |
| 12 | −1.3023 | 0.2500 | 1.95375 | 32.32 |
| 13 | 2.2754 | DD[13] | | |
| 14 | 2.7824 | 1.2300 | 1.43875 | 94.66 |
| 15 | −3.5051 | 0.1000 | | |
| 16 | 2.9348 | 1.3100 | 1.43875 | 94.66 |
| 17 | −1.9932 | 0.3500 | 1.92286 | 18.90 |
| 18 | −6.1308 | 1.2426 | | |
| 19 | ∞ | 3.2000 | 1.88299 | 40.78 |
| 20 | ∞ | 0.4000 | 1.47144 | 65.41 |
| 21(Sim) | ∞ | | | |

TABLE 4

Example 2

| | Farthest point-observation state | Nearest point-observation state |
|---|---|---|
| Object distance | 18.95 | 1.93 |
| Image formation magnification | −0.0566 | −0.6816 |
| f | 1.136 | 1.900 |
| FNo. | 9.05 | 12.31 |
| 2ω(°) | 140.4 | 58.2 |
| DD[7] | 1.05 | 0.15 |

TABLE 4-continued

Example 2

| | Farthest point-observation state | Nearest point-observation state |
|---|---|---|
| DD[9] | 0.17 | 1.07 |
| DD[10] | 0.17 | 0.92 |
| DD[13] | 1.37 | 0.62 |

Example 3

Figure 6:
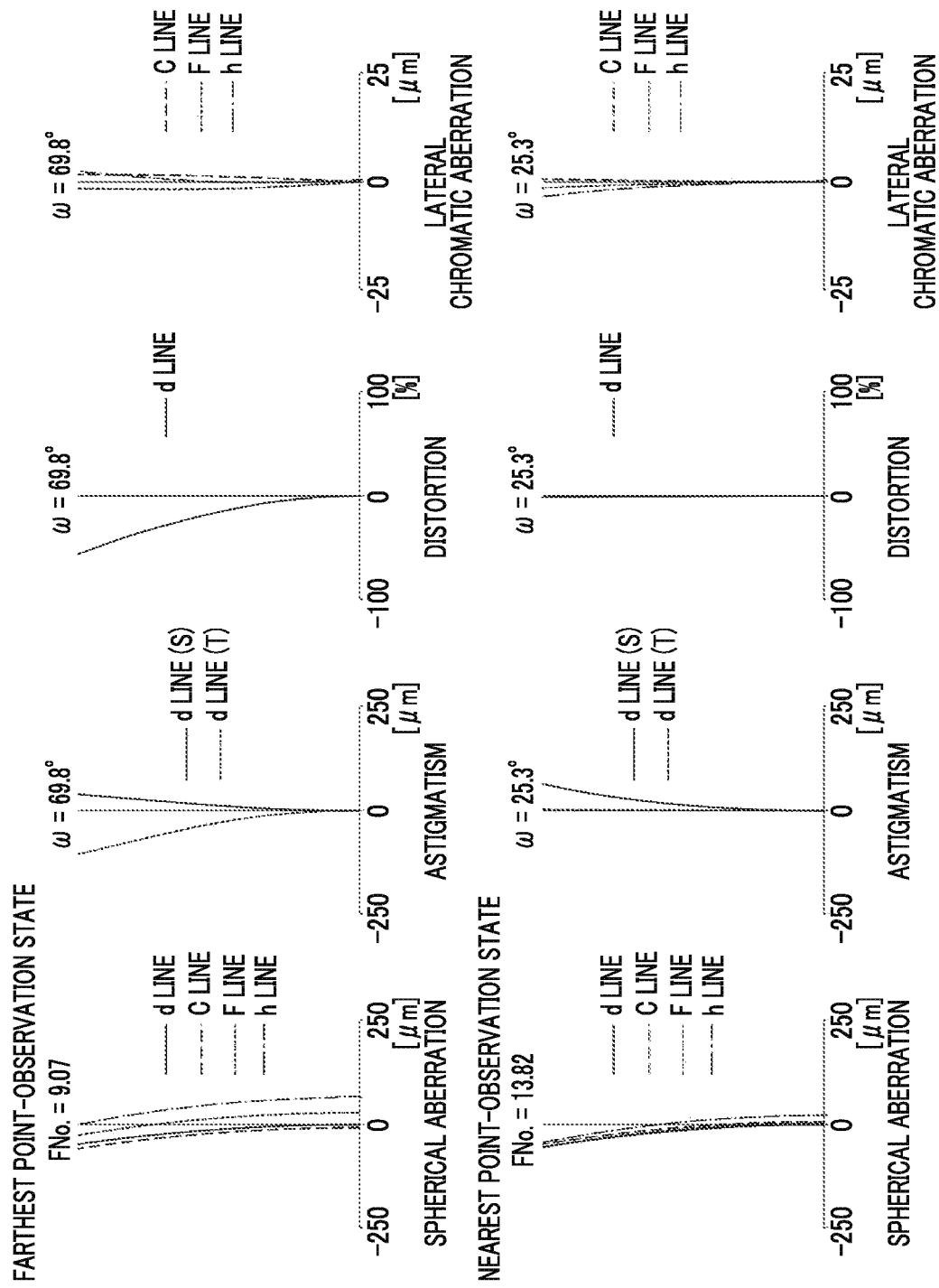
FIG. 6 is a diagram showing the respective aberrations of the objective lens for an endoscope of Example 3 of the disclosure.

A cross-sectional view showing the configuration of an objective lens for an endoscope of Example 3 is shown in FIG. 5. The objective lens for an endoscope of Example 3 has the same configuration as the overview of the objective lens for an endoscope of Example 1. The basic lens data of the objective lens for an endoscope of Example 3 are shown in Table 5, the specifications and variable surface intervals thereof are shown in Table 6, and diagrams showing the respective aberrations thereof are shown in FIG. 6.

TABLE 5

Example 3

| Sn | R | D | Nd | vd |
|---|---|---|---|---|
| 1 | ∞ | 0.3500 | 1.88299 | 40.78 |
| 2 | 1.5057 | 0.6165 | | |
| 3 | ∞ | 0.3500 | 2.00100 | 29.13 |
| 4 | ∞ | 0.6604 | | |
| 5 | −2.4474 | 0.4000 | 1.88299 | 40.78 |
| 6 | 1.3641 | 0.9738 | 1.49700 | 81.54 |
| 7 | −1.4230 | DD[7] | | |
| 8 | 2.5845 | 0.6853 | 1.49700 | 81.54 |
| 9 | −2.3861 | DD[9] | | |
| 10(St) | ∞ | DD[10] | | |
| 11 | −15.5744 | 0.6185 | 1.92286 | 18.90 |
| 12 | −1.4252 | 0.3600 | 1.91082 | 35.25 |
| 13 | 2.3841 | DD[13] | | |
| 14 | 2.6161 | 0.9660 | 1.43875 | 94.66 |
| 15 | −3.1116 | 0.1291 | | |
| 16 | 4.8811 | 1.3804 | 1.43875 | 94.66 |
| 17 | −1.6182 | 0.3500 | 1.92286 | 18.90 |
| 18 | −3.7717 | 1.2820 | | |
| 19 | ∞ | 3.2000 | 1.88299 | 40.78 |
| 20 | ∞ | 0.4000 | 1.47144 | 65.41 |
| 21(Sim) | ∞ | | | |

TABLE 6

Example 3

| | Farthest point-observation state | Nearest point-observation state |
|---|---|---|
| Object distance | 10.40 | 1.24 |
| Image formation magnification | −0.0963 | −0.9668 |
| f | 1.113 | 1.954 |
| FNo. | 9.07 | 13.82 |
| 2ω(°) | 139.6 | 50.6 |
| DD[7] | 1.06 | 0.15 |
| DD[9] | 0.19 | 1.10 |
| DD[10] | 0.17 | 1.25 |
| DD[13] | 1.44 | 0.37 |

Example 4

Figure 8:
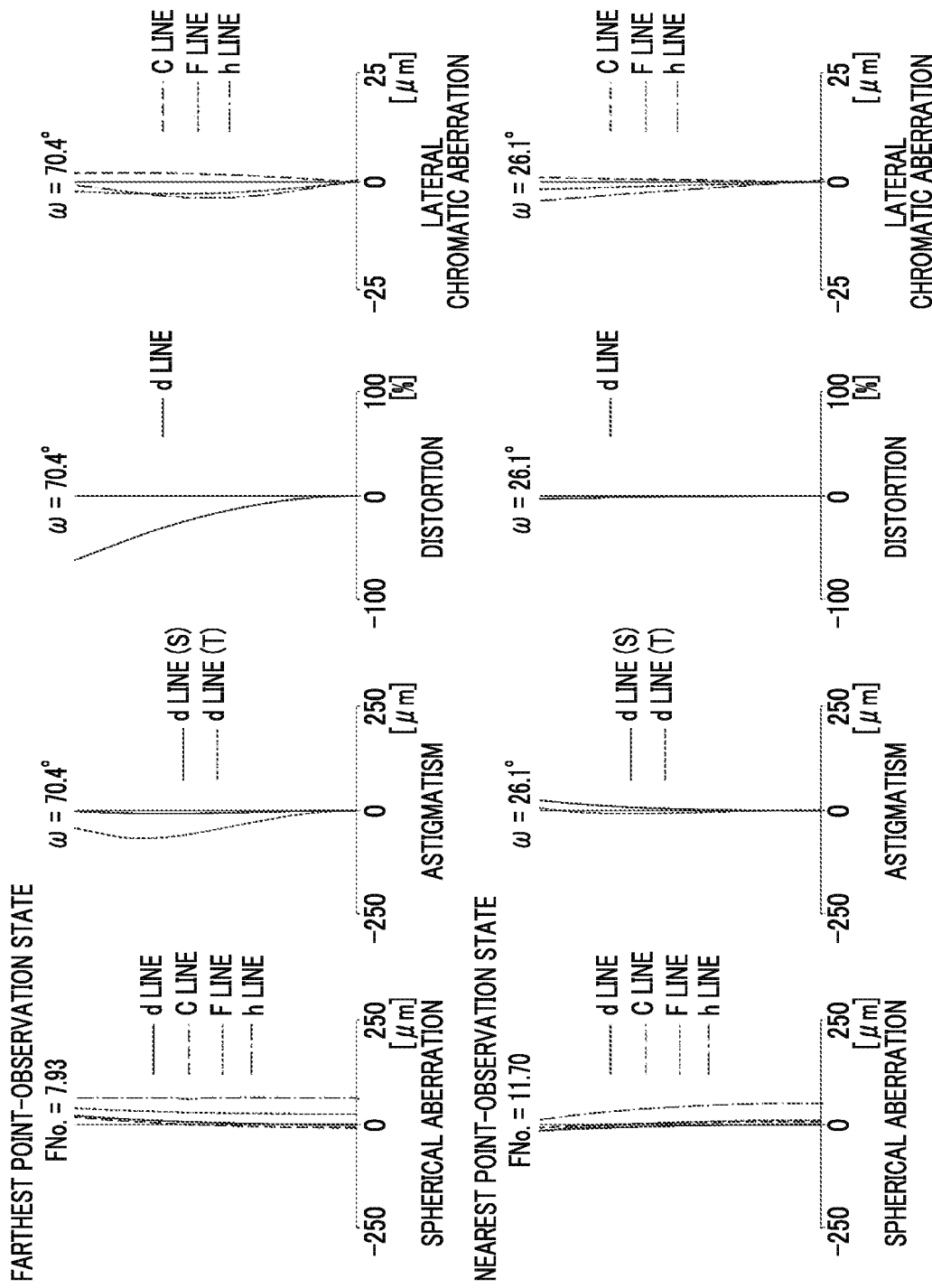
FIG. 8 is a diagram showing the respective aberrations of the objective lens for an endoscope of Example 4 of the disclosure.

A cross-sectional view showing the configuration of an objective lens for an endoscope of Example 4 is shown in FIG. 7. The objective lens for an endoscope of Example 4 has the same configuration as the overview of the objective lens for an endoscope of Example 1. The basic lens data of the objective lens for an endoscope of Example 4 are shown in Table 7, the specifications and variable surface intervals thereof are shown in Table 8, and diagrams showing the respective aberrations thereof are shown in FIG. 8.

TABLE 7

Example 4

| Sn | R | D | Nd | νd |
|---|---|---|---|---|
| 1 | ∞ | 0.4500 | 1.88299 | 40.78 |
| 2 | 1.3120 | 0.6067 | | |
| 3 | ∞ | 0.3746 | 2.00100 | 29.13 |
| 4 | ∞ | 0.6011 | | |
| 5 | −4.5141 | 0.2970 | 1.88299 | 40.78 |
| 6 | 1.2340 | 1.0168 | 1.43875 | 94.66 |
| 7 | −1.4350 | DD[7] | | |
| 8 | 2.5306 | 0.7025 | 1.49700 | 81.54 |
| 9 | −2.2042 | DD[9] | | |
| 10(St) | ∞ | DD[10] | | |
| 11 | −24.1097 | 0.6869 | 1.78472 | 25.68 |
| 12 | −0.8530 | 0.3510 | 1.88299 | 40.78 |
| 13 | 3.0564 | DD[13] | | |
| 14 | 2.2523 | 0.8899 | 1.49700 | 81.54 |
| 15 | −6.2542 | 0.2909 | | |
| 16 | 4.6632 | 1.2329 | 1.43875 | 94.66 |
| 17 | −1.4500 | 0.4670 | 1.92286 | 18.90 |
| 18 | −3.2666 | 1.2175 | | |
| 19 | ∞ | 3.2000 | 1.88299 | 40.78 |
| 20 | ∞ | 0.4000 | 1.47144 | 65.41 |
| 21(Sim) | ∞ | | | |

TABLE 8

Example 4

| | Farthest point-observation state | Nearest point-observation state |
|---|---|---|
| Object distance | 20.20 | 1.37 |
| Image formation magnification | −0.0527 | −0.9165 |
| f | 1.123 | 1.948 |
| FNo. | 7.93 | 11.70 |
| 2ω(°) | 140.8 | 52.2 |
| DD[7] | 1.06 | 0.15 |
| DD[9] | 0.17 | 1.08 |
| DD[10] | 0.17 | 1.17 |
| DD[13] | 1.33 | 0.34 |

Example 5

Figure 10:
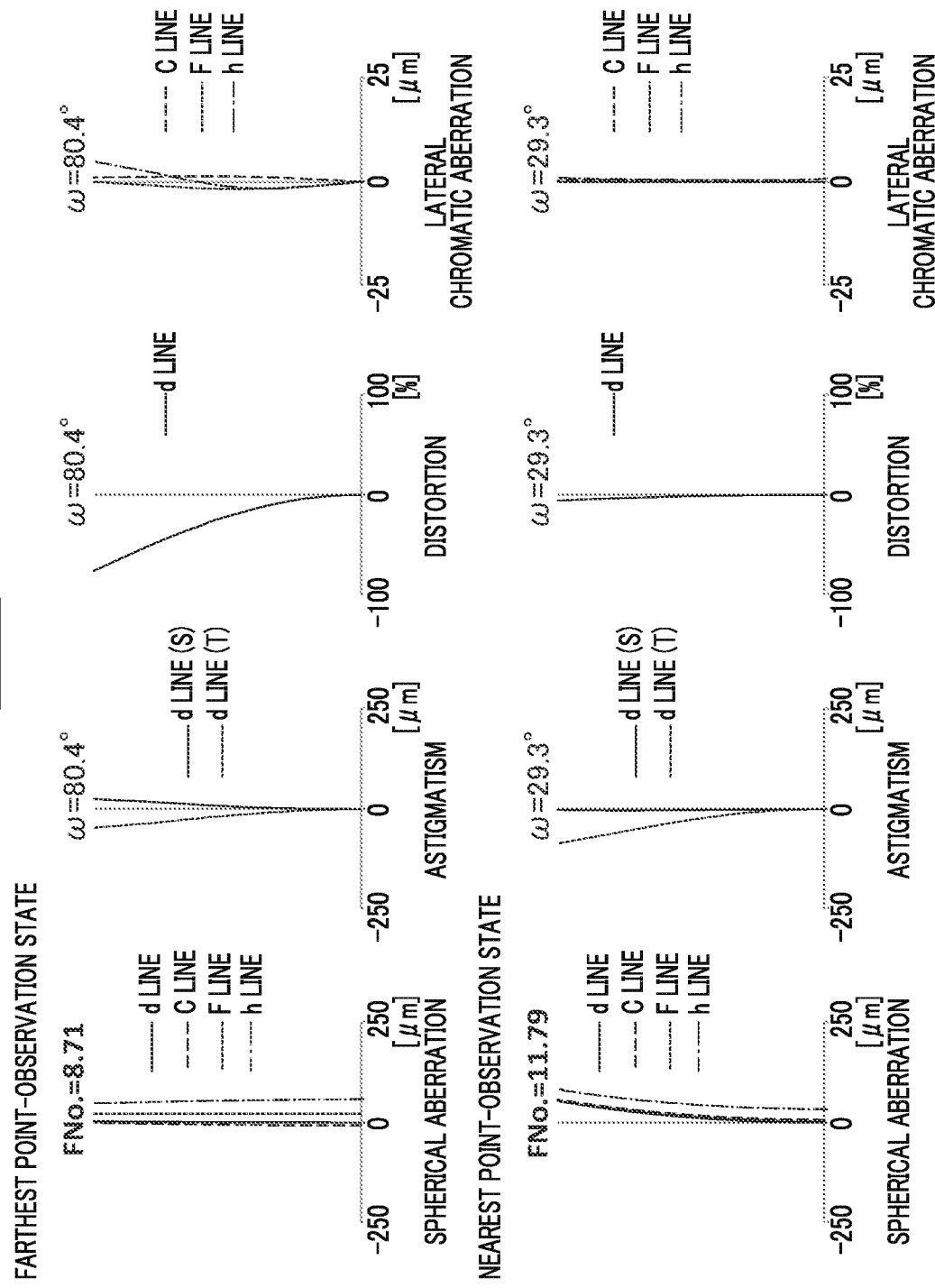
FIG. 10 is a diagram showing the respective aberrations of the objective lens for an endoscope of Example 5 of the disclosure.

A cross-sectional view showing the configuration of an objective lens for an endoscope of Example 5 is shown in FIG. 9. The objective lens for an endoscope of Example 5 has the same configuration as the overview of the objective lens for an endoscope of Example 1. The basic lens data of the objective lens for an endoscope of Example 5 are shown in Table 9, the specifications and variable surface intervals thereof are shown in Table 10, and diagrams showing the respective aberrations thereof are shown in FIG. 10.

TABLE 9

Example 5

| Sn | R | D | Nd | νd |
|---|---|---|---|---|
| 1 | ∞ | 0.3500 | 1.88299 | 40.78 |
| 2 | 1.2496 | 0.5900 | | |
| 3 | ∞ | 0.3000 | 2.00100 | 29.13 |
| 4 | ∞ | 1.0100 | | |
| 5 | −9.9601 | 0.4000 | 2.00100 | 29.13 |
| 6 | 1.7105 | 0.8800 | 1.51742 | 52.43 |
| 7 | −1.7105 | DD[7] | | |
| 8 | 5.4888 | 0.6800 | 1.59522 | 67.73 |
| 9 | −2.3793 | DD[9] | | |
| 10(St) | ∞ | DD[10] | | |
| 11 | ∞ | 0.7200 | 1.89286 | 20.36 |
| 12 | −0.9525 | 0.2500 | 1.95375 | 32.32 |
| 13 | 2.4380 | DD[13] | | |
| 14 | 2.8578 | 1.0500 | 1.43875 | 94.66 |
| 15 | −2.8578 | 0.1000 | | |
| 16 | 3.3386 | 1.3100 | 1.43875 | 94.66 |
| 17 | −1.9004 | 0.3500 | 1.94595 | 17.98 |
| 18 | −4.9136 | 1.2409 | | |
| 19 | ∞ | 3.2000 | 1.88299 | 40.78 |
| 20 | ∞ | 0.4000 | 1.47144 | 65.41 |
| 21(Sim) | ∞ | | | |

TABLE 10

Example 5

| | Farthest point-observation state | Nearest point-observation state |
|---|---|---|
| Object distance | 13.50 | 1.75 |
| Image formation magnification | −0.0679 | −0.6580 |
| f | 0.994 | 1.778 |
| FNo. | 8.71 | 11.79 |
| 2ω(°) | 160.8 | 58.6 |
| DD[7] | 1.31 | 0.25 |
| DD[9] | 0.17 | 1.23 |
| DD[10] | 0.17 | 0.86 |
| DD[13] | 1.43 | 0.73 |

The values of Conditional expressions (1) to (5) corresponding to the objective lenses for an endoscope of Examples 1 to 5 are shown in Table 11. In Examples 1 to 5, the d line is used as a reference wavelength Table 11 shows values with respect to the d line.

TABLE 11

| Expression number | Expression | Example 1 | Example 2 | Example 3 | Example 4 | Example 5 |
|---|---|---|---|---|---|---|
| (1) | fw/ft | 0.611 | 0.598 | 0.570 | 0.577 | 0.559 |
| (2) | f3/fw | −2.029 | −1.981 | −2.025 | −1.980 | −2.194 |
| (3) | f2/fw | 2.475 | 2.373 | 2.350 | 2.220 | 2.898 |

TABLE 11-continued

| Expression number | Expression | Example 1 | Example 2 | Example 3 | Example 4 | Example 5 |
|---|---|---|---|---|---|---|
| (4) | f12t/f34t | 0.065 | 0.069 | 0.019 | 0.003 | 0.130 |
| (5) | (d23t − d23w)/ (fw × ft)$^{1/2}$ | 1.148 | 1.127 | 1.349 | 1.289 | 1.320 |

The objective lenses for an endoscope of Examples 1 to 5 are compact, the total angles of view thereof in the farthest point-observation state are 135° or more, and the absolute values of image formation magnification thereof in the nearest point-observation state are 0.65 or more. Accordingly, both a wide angle of view in a far point-side observation state and high magnification in a near point-side observation state are achieved. Further, the objective lenses for an endoscope of Examples 1 to 5 do not have a large change in performance between the farthest point-observation state and the nearest point-observation state, and maintains high optical performance since the aberrations thereof are satisfactorily corrected in both the states.

Figure 11:
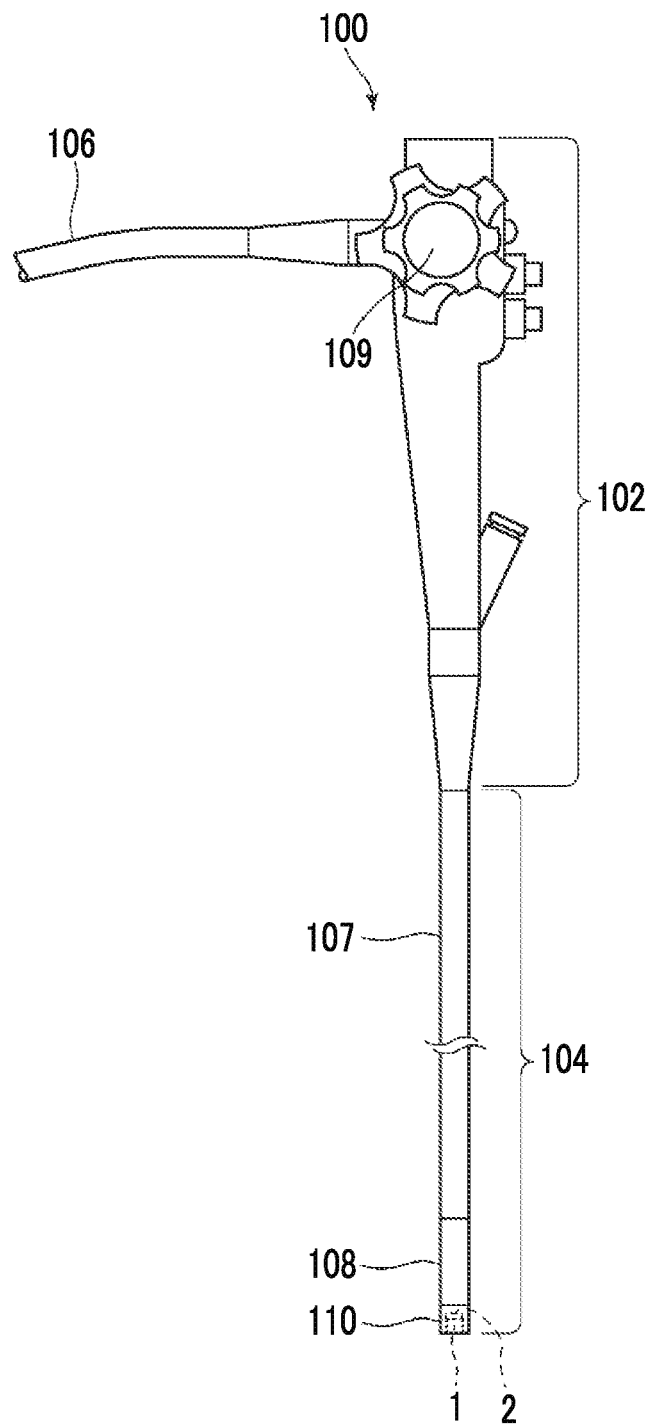
FIG. 11 is a diagram showing the schematic configuration of an endoscope according to an embodiment of the disclosure.

Next, an endoscope according to an embodiment of the disclosure will be described. A diagram showing the schematic configuration of the entire endoscope according to the embodiment of the disclosure is shown in FIG. 11. The endoscope 100 shown in FIG. 11 mainly comprises an operation part 102, an insertion part 104, and a universal cord 106 that is to be connected to a connector part (not shown). A large portion of the insertion part 104 is a soft portion 107 that is bendable in any direction along an insertion path, a bendable portion 108 is connected to the distal end of the soft portion 107, and a distal end portion 110 is connected to the distal end of the bendable portion 108. The bendable portion 108 is provided to allow the distal end portion 110 to face a desired direction, and can be operated to be bent by the rotational movement of bending operation knobs 109 provided on the operation part 102. The objective lens 1 for an endoscope according to the embodiment of the disclosure and an image pickup element 2 are provided in the distal end of the distal end portion 110. The image pickup element 2 is, for example, a charge coupled device (CCD), a complementary metal oxide semiconductor (CMOS), or the like. The image pickup element 2 is disposed so that the image pickup surface of the image pickup element 2 coincides with the image plane of the objective lens 1 for an endoscope. The objective lens 1 for an endoscope and the image pickup element 2 are conceptually shown in FIG. 11.

A technique of the disclosure has been described above using the embodiments and the examples, but the technique of the disclosure may have various modifications without being limited to the embodiments and the examples. For example, the radius of curvature, the surface interval, the refractive index, the Abbe's number, and the like of each lens may have other values without being limited to values shown in the respective numerical examples.

What is claimed is:

1. An objective lens for an endoscope comprising:
only four lens groups as lens groups, the four lens groups consisting of a first lens group having negative refractive power, a second lens group having positive refractive power, a third lens group having negative refractive power, and a fourth lens group having positive refractive power that are arranged in this order from an object side toward an image side,
wherein the first lens group is fixed and the second and third lens groups are moved along an optical axis during focusing on an object positioned at a nearest point from an object positioned at a farthest point, and
in a case where a focal length of the objective lens for an endoscope, which focuses on the object positioned at the farthest point, is denoted by fw, a focal length of the objective lens for an endoscope, which focuses on the object positioned at the nearest point, is denoted by ft, and a focal length of the third lens group is denoted by f3, Conditional expressions (1) and (2) are satisfied, $$0 < fw/ft < 0.63 \qquad (1),$$

$$-2.3 < f3/fw < 0 \qquad (2).$$

2. The objective lens for an endoscope according to claim 1,
wherein in a case where a focal length of the second lens group is denoted by f2,
Conditional expression (3) is satisfied, $$1.9 < f2/fw < 5 \qquad (3).$$

3. The objective lens for an endoscope according to claim 1,
wherein in a case where a combined focal length of the first and second lens groups in a state where the objective lens for an endoscope focuses on the object positioned at the nearest point is denoted by f12t, and a combined focal length of the third and fourth lens groups in a state where the objective lens for an endoscope focuses on the object positioned at the nearest point is denoted by f34t,
Conditional expression (4) is satisfied, $$0 < f12t/f34t < 0.25 \qquad (4).$$

4. The objective lens for an endoscope according to claim 1,
wherein an aperture stop is disposed between the second and third lens groups.

5. The objective lens for an endoscope according to claim 4,
wherein the aperture stop is fixed during focusing on the object positioned at the nearest point from the object positioned at the farthest point.

6. The objective lens for an endoscope according to claim 1,
wherein the second lens group is moved to the object side and the third lens group is moved to the image side during focusing on the object positioned at the nearest point from the object positioned at the farthest point.

7. The objective lens for an endoscope according to claim 1,
wherein in a case where an interval on the optical axis between the second and third lens groups in a state where the objective lens for an endoscope focuses on the object positioned at the nearest point is denoted by d23t, and an interval on the optical axis between the second and third lens groups in a state where the objective lens for an endoscope focuses on the object positioned at the farthest point is denoted by d23w, Conditional expression (5) is satisfied, $$1<(d23t-d23w)/(fw \times ft)^{1/2}<1.5 \qquad (5).$$

8. The objective lens for an endoscope according to claim 1,
wherein the first lens group includes only three lenses as lenses, and the three lenses consist of a first lens having negative refractive power, a second lens having negative refractive power, and a third lens having positive refractive power that are arranged in this order from the object side toward the image side, and
the second and third lenses are cemented to each other.

9. The objective lens for an endoscope according to claim 8,
wherein a lens surface of the first lens close to the object side is a flat surface.

10. The objective lens for an endoscope according to claim 1,
wherein the second lens group consists of a fourth lens having positive refractive power.

11. The objective lens for an endoscope according to claim 1,
wherein the third lens group consists of a cemented lens in which a fifth lens having positive refractive power and a sixth lens having negative refractive power are cemented in this order from the object side toward the image side.

12. The objective lens for an endoscope according to claim 1,
wherein the fourth lens group consists of a seventh lens having positive refractive power, an eighth lens having positive refractive power, and a ninth lens having negative refractive power that are arranged in this order from the object side toward the image side, and
the eighth and ninth lenses are cemented to each other.

13. The objective lens for an endoscope according to claim 1,
wherein Conditional expression (1-1) is satisfied, $$0.5<fw/ft<0.62 \qquad (1-1).$$

14. The objective lens for an endoscope according to claim 1,
wherein Conditional expression (2-1) is satisfied, $$-2.1<f3/fw<-1.5 \qquad (2-1).$$

15. The objective lens for an endoscope according to claim 2,
wherein Conditional expression (3-1) is satisfied, $$2.2<f2/fw<2.8 \qquad (3-1).$$

16. The objective lens for an endoscope according to claim 3,
wherein Conditional expression (4-1) is satisfied, $$0<f12t/f34t<0.15 \qquad (4-1).$$

17. The objective lens for an endoscope according to claim 7,
wherein Conditional expression (5-1) is satisfied, $$1.1<(d23t-d23w)/(fw \times ft)^{1/2}<1.38 \qquad (5-1).$$

18. An endoscope comprising:
the objective lens for an endoscope according to claim 1.

* * * * *